United States Patent [19]

Köhler et al.

[11] Patent Number: 5,633,339

[45] Date of Patent: May 27, 1997

[54] USE OF TERTIARY ALIPHATIC MONOCARBOXYLIC ACIDS AS CHAIN TERMINATORS FOR THE PREPARATION OF POLYCARBONATES AND OF POLYESTER CARBONATES

[75] Inventors: Burkhard Köhler; Wolfgang Ebert, both of Krefeld; Klaus Horn, Dormagen; Walter Schäfer, Leichlingen; Jürgen Kirsch, Leverkusen; Rolf Dhein, Krefeld, all of Germany

[73] Assignee: Bayer Aktiengesellschaft, Leverkusen, Germany

[21] Appl. No.: 438,519

[22] Filed: May 10, 1995

[30] Foreign Application Priority Data

May 20, 1994 [DE] Germany .................. 44 17 761.8

[51] Int. Cl.$^6$ ..................................... C08G 65/38
[52] U.S. Cl. ............... 528/219; 528/86; 528/176; 528/196; 528/271; 528/272; 528/295.3
[58] Field of Search ................ 528/86, 176, 196, 528/219, 271, 272, 295.3

[56] References Cited

U.S. PATENT DOCUMENTS 4,939,231  7/1990  Masumoto et al. ............... 528/198

FOREIGN PATENT DOCUMENTS

| 0 097 828 | 1/1984 | European Pat. Off. . |
| 2 350 370 | 12/1977 | France . |
| 26 20 256 | 11/1977 | Germany . |
| 38 29 744 | 3/1989 | Germany . |

OTHER PUBLICATIONS

Derwent Database, JP 62 141 023 (Jun. 24, 1987).

Primary Examiner—Samuel A. Acquah
Attorney, Agent, or Firm—Connolly and Hutz

[57] ABSTRACT

The present invention relates to the use of special monocarboxylic acids as chain terminators for the preparation of polycarbonates and of polyester carbonates, and to the polycarbonates and polyester carbonates obtainable according to the invention.

16 Claims, No Drawings

USE OF TERTIARY ALIPHATIC MONOCARBOXYLIC ACIDS AS CHAIN TERMINATORS FOR THE PREPARATION OF POLYCARBONATES AND OF POLYESTER CARBONATES

The present invention relates to the use of tertiary aliphatic monocarboxylic acids having 9 to 16 C atoms, preferably those having 9 to 13 C atoms, as chain terminators for the preparation of thermoplastic aromatic polycarbonates.

In particular, the aromatic polycarbonates obtainable according to the invention have an improved resistance to thermal deformation in relation to comparable polycarbonates which contain linear aliphatic monocarboxylic acids incorporated as chain terminators, for example in relation to those disclosed in JA-34992/76 and in DE-OS 2 620 256 (Le A 16 686).

The present invention accordingly also relates to thermoplastic aromatic polycarbonates containing tertiary aliphatic monocarboxyl terminal groups having 9 to 16 C atoms, preferably those having 9 to 13 C atoms.

The preparation of the thermoplastic aromatic polycarbonates according to the invention with the use of tertiary monocarboxylic acids is preferably effected by the two-phase boundary process, without the monocarboxylic acids having to be previously converted into monocarboxylic acid halides.

As far as is known, this has only been achieved hitherto with monocarboxylic acids of $\overline{M}n$ (number average molecular weight) higher than 600 according to DE-OS 2 636 783 (Le A 16 689) and DE-OS 2 702 626 (Le A 17 356), or when using the pyridine method (JA-34992/76, Example 8), or with the simultaneous combined use of monophenol chain terminators (DE-OS 2 620 256, Example 4).

Poly-($C_2$-$C_{10}$-$\alpha$-olefine) carboxylic acids with an Mw of 2000 to 350,000 and which have a COOH functionality of 0.5 to 2.0 per molecule are known from DE-OS 3 618 378 (Le A 24 330) (page 5, lines 7–13 of this DE-OS). These carboxylic acids are used, after their conversion into the corresponding acid halides, for the preparation of polyolefine-polycarbonate bulk copolymers (page 3, lines 7–10 of this DE-OS). Therefore there is also no direct linkage of the carboxylic acid to the polycarbonate molecule here.

Accordingly, the present invention also relates to a method of preparing the polycarbonates according to the invention having branched aromatic monocarboxyl terminal groups, from diphenols, chain terminators, phosgene and optionally branching agents, by the two-phase boundary process, which is characterized in that tertiary aliphatic monocarboxylic acids having 9 to 16 C atoms, preferably those having 9 to 13 C atoms, are used as the chain terminators, in amounts from 0.6 mole % to 10 mole %, preferably from 2 mole % to 7 mole %, based on the moles of diphenols.

The present invention further relates to the thermoplastic aromatic polycarbonates obtainable by the method according to the invention.

The thermoplastic aromatic polycarbonates obtainable according to the invention have weight average molecular weights $\overline{M}w$ (determined by gel chromatography in the known manner) from 5000 to 200,000, preferably from 10,000 to 40,000.

According to the invention, tertiary aliphatic monocarboxylic acids are mixtures of different monocarboxylic acids, the major constituent of which corresponds in each case to formula (I)

where $R^1$, $R^2$ and $R^3$ each represent mutually independent $C_1$-$C_{12}$ alkyl radicals, preferably $C_1$-$C_9$ alkyl radicals, wherein the total number of C atoms is 9 to 16, preferably 9 to 13.

Acids may also be present in subsidiary amounts, up to a maximum of 20 weight % of each based on the total weight each time, in which $R^1$ is also hydrogen. The $R^1$, $R^2$ and $R^3$ radicals may be linear or branched; they are preferably branched.

Examples of tertiary monocarboxylic acids comprise those which are obtained by the Koch synthesis, namely by the action of CO in the presence of strong protonic acids such as $H_2SO_4$ on olefines, preferably oligomerized propene or oligomerized butene, particularly isobutene.

Acids of this type which contain tertiary COOH groups are obtainable commercially as versatic® acids from the Shell company (see Römpps Chemic Lexicon [*Römpp's Chemical Encyclopedia*], Eighth Edition, Franckh'sche Verlagshandlung, Stuttgart, Volume 6, T-Z, 1988, pages 4501 and 4502).

These acids are known to be difficult to esterify (see Römpps Chemic Lexicon, loc. cit.), so that they were not expected to react directly under the conditions of the phase boundary process without being converted into the corresponding acid halides.

In contrast to alkali salts of higher linear carboxylic acids, such as stearic acid for instance, the alkali salts of versatic acids, i.e. alkali versatates, are readily soluble in water, so that transfer into the organic phase which is necessary for incorporation in the polycarbonate appeared improbable. Nevertheless the rate of incorporation is enhanced compared with unbranched primary carboxylic acids.

Monocarboxylic acids which are suitable according to the invention and which are particularly preferred are versatic® acid 9 and versatic® acid 10.

Preferred starting materials for the preparation of the versatic® acids which are suitable according to the invention comprise dimerized or trimerized isobutene or trimerized or tetramerized propene.

Diphenols of formula

preferably having 6 to 30 C atoms, which are suitable for the preparation of the polycarbonates according to the invention, comprise both mononuclear and polynuclear diphenols which may contain heteroatoms and which may comprise substituents which are inert under the conditions of polycarbonate production and thermal treatment.

Examples include hydroquinone, resorcinol, dihydroxydiphenyl, bis-(hydroxyphenyl)-alkanes, bis-(hydroxyphenyl)-cycloalkanes, bis-(hydroxyphenyl) sulphides, -ethers, -ketones, -sulphoxides, -sulphones and $\alpha,\alpha$-bis-(hydroxyphenyl)-diisopropylbenzenes, as well as their compounds with alkylated and halogenated nuclei.

Examples of suitable diphenols are described in U.S. Pat. Nos. 3,028,365, 2,999,835, 3,062,781, 3,148,172 and 4,982,014, in German Offenlegungsschriften 1 570 703 and 2 063 050, and in the monograph by H. Schnell "Chemistry and Physics of Polycarbonates, Interscience Publishers, New York, 1964".

Preferred diphenols comprise 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, α,α-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)-2-methylbutane, 1,1-bis-(3,5-dimethyl-4-hydroxyphenyl) -cyclohexane, α,α'-bis-(3,5-dimethyl-4-hydroxyphenyl) -p-diisopropylbenzene, 1,1-bis-(4-hydroxyphenyl)-3,3,5-trimethylcyclohexane, 1,1-bis-(4-hydroxyphenyl)-3-methylcyclohexane, 1,1-bis-(4-hydroxyphenyl)-3,3-dimethylcyclohexane, 1,1-bis-(4-hydroxyphenyl)-4-methyl-cyclohexane, 2,2-bis-(3,5-dichloro-4-hydroxyphenyl)-propane and 2,2-bis-(3,5-dibromo-4-hydroxyphenyl)-propane.

Examples of particularly preferred diphenols include:

2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane, 1,1-bis-(4-hydroxyphenyl)-3,3,5-trimethylcyclohexane, 1,1-bis-(4-hydroxyphenyl)-3-methylcyclohexane, 1,1-bis-(3,5-dimethyl-4-hydroxyphenyl)-4-methylcyclohexane.

2,2-bis-(4-hydroxyphenyl)-propane and 1,1-bis -(4-hydroxyphenyl)-3,3,5-trimethylcyclohexane are most particularly preferred.

Any desired mixtures of the above-mentioned diphenols may also be used.

For the purpose of improving the flow behaviour, small amounts, preferably amounts between 0.05 and 2.0 mole % (based on the moles of diphenols used), of trifunctional compounds or compounds of functionality greater than three, particularly those containing three or more than three phenolic hydroxyl groups, may also be used in combination in the known manner. Examples of some of the compounds having three or more than three phenolic hydroxyl groups which can be used comprise 1,3,5-tri-(4-hydroxyphenyl)-benzene, 1,1,1,-tri-(4-hydroxyphenyl)-ethane, 2,6-bis-(2-hydroxy-5'-methyl-benzyl)-4-methylphenol, 2-(4-hydroxyphenyl)-2-(2,4-dihydroxyphenyl)-propane, hexa-(4-(4-hydroxyphenylisopropyl)-phenyl)-ortho -terephthalic acid ester, tetra-(4-hydroxyphenyl)-methane and 1,4-bis-(4', 4"-dihydroxytriphenyl)methyl)-benzene. Some of the other trifunctional compounds comprise 2,4-dihydroxybenzoic acid, trimesic acid, cyanuric chloride and 3,3-bis-(4-hydroxy-3-methyl -phenyl)-2-oxo-2,3-dihydroindole.

The preparation of the polycarbonates according to the invention can be carried out as follows:

The diphenols to be used are firstly dissolved in an aqueous alkaline phase. The chain terminators which are necessary for the preparation of the polycarbonates according to the invention are added dissolved in an organic solvent or without a solvent to this phase in amounts from 0.6 to 10 mole %, based on the moles of diphenol. Reaction with phosgene is then effected in the presence of an inert organic phase which preferably dissolves polycarbonate. The reaction temperature is between 0° C. and 40° C.

The addition of the requisite chain terminators of the type and in the amounts as cited above may also be effected during phosgenation.

Examples of suitable organic solvents for the chain terminators include methylene chloride, chlorobenzene, mixtures of methylene chloride and chlorobenzene, acetone, acetonitrile, or toluene.

Suitable organic solvents for the polycarbonates comprise $CH_2Cl_2$, chlorobenzene or mixtures of $CH_2Cl_2$ and chlorobenzene.

The reaction may be enhanced by catalysts such as tributylamine or triethylamine. Onium salts, such as tetraalkylammonium halides for instance, may also be used in combination as phase transfer catalysts in order to enhance the incorporation of the chain terminator.

If branching agents are used, they may be added before the reaction with phosgene or during phosgenation.

The chlorocarbonic acid esters of the diphenols may also be used in addition to or instead of the diphenols.

The polycarbonates according to the invention are isolated in the known manner. Particularly suitable work-up procedures comprise precipitation, spray drying and evaporation of the solvent under vacuum.

In the case of bisphenol-A polycarbonates, the polycarbonates which are preferred according to the invention are substantially free from oligomers with a molecular weight $\leq 508$ g/mole (versatic acid 9 as the chain terminator), wherein it is assumed that the diester of bisphenol-A with two versatic acids is theoretically the smallest oligomer, whilst polycarbonates having terminal phenols can contain diphenyl carbonate with a molecular weight of 214 g/mole as the smallest oligomer, for example.

The polycarbonates which are preferred according to the invention are free from chain terminators when produced by the phase boundary process, since as stated above versatic acids are readily soluble in alkaline aqueous media and are therefore completely extracted from the organic polycarbonate phase.

As has already been mentioned at the outset, a particular property of the polycarbonates according to the invention is their elevated glass transition temperature, which also signifies an improved resistance to thermal deformation compared with polycarbonates which are produced using linear monocarboxylic acids as chain terminators, and also compared with those which are produced using monophenols as chain terminators.

The normal additives for thermoplastic polycarbonates, such as stabilizers, demoulding agents, pigments, flame retardants, antistatic agents, fillers and reinforcing materials may also be added in the usual amounts to the polycarbonates according to the invention either before or after their processing.

The polycarbonates according to the invention may be processed to form mouldings, for example by extruding the polycarbonates which are isolated in the known manner to form a granular material and processing this granular material by injection moulding in the known manner to form various articles, optionally after the addition of the above-mentioned additives.

The polycarbonates according to the invention can be used as mouldings for all the applications for which the polycarbonates known hitherto have been used, and therefore for example in the electrical field and in the constructional field, particularly where increased resistance to thermal deformation is required.

Examples of use include films, composite films, mouldings produced by extrusion and injection moulding with or without fillers or glass fibre reinforcement, such as safety helmets, foamed materials, sheet materials and blown products for example, as well as medical articles such as flexible tubing and short-term implants.

The method according to the invention for the preparation of aromatic polycarbonates having tertiary aliphatic monocarboxyl terminal groups can also be extended to the preparation of aromatic polyester carbonates, by replacing part of the carbonate source by reactive aromatic dicarboxylic acid derivatives, preferably by aromatic dicarboxylic acid dichlorides.

Accordingly, the present invention also relates to the use of tertiary aliphatic monocarboxylic acids having 9 to 16 C atoms, most preferably those having 9 to 13 C atoms, as chain terminators for the preparation of thermoplastic aromatic polyester carbonates.

Accordingly, the present invention also relates to a method of preparing thermoplastic aromatic polyester carbonates from diphenols, chain terminators, phosgene, reactive aromatic dicarboxylic acid derivatives and optionally branching agents, by the two-phase boundary process, which is characterized in that tertiary aliphatic monocarboxylic acids having 9 to 16 C atoms, preferably those having 9 to 13 C atoms, are used as the chain terminators, in amounts from 0.6 mole % to 10 mole %, preferably from 2 mole % to 7 mole %, based on the moles of diphenols used.

Reactive aromatic dicarboxylic acid derivatives are those which react bifunctionally under the conditions of the phase boundary process. Diacid dichlorides are preferred, as mentioned above.

The preferred aromatic dicarboxylic acids are isophthalic acid and terephthalic acid and their mixtures, the preferred derivatives of which are the dichlorides and dimethyl esters.

The statements made above in relation to the preparation of the polycarbonates according to the invention are applicable as regards the diphenols and branching agents to be used and the reaction conditions to be adhered to.

The ratio of phosgene to reactive aromatic dicarboxylic acid derivative may vary within wide limits, wherein up to 40 mole %, based on the total moles of phosgene + dicarboxylic acid derivative, may preferably be replaced by the reactive dicarboxylic acid derivative, depending on the extent to which the polycarbonate according to the invention is to be modified to obtain an even higher resistance to thermal deformation.

Accordingly, the present invention also relates to aromatic polyester carbonates obtainable according to the invention with average molecular weights $\overline{M}w$ (weight average molecular weights, determined by gel chromatography) from 5000 to 200,000, preferably from 10,000 to 40,000.

The present invention also relates to thermoplastic aromatic polyester carbonates, which are optionally branched, with weight average molecular weights $\overline{M}w$ (determined as above) from 5000 to 200,000, preferably from 10,000 to 40,000, containing tertiary aliphatic monocarboxyl terminal groups having 9 to 16 C atoms, preferably those having 9 to 13 C atoms.

The polyester carbonates according to the invention have a property spectrum which is characterized by high toughness at low temperatures combined with an improved resistance to thermal deformation.

The statements made above in relation to the preparation of the polycarbonates according to the invention are applicable as regards isolation, the addition of additives and thermoplastic processing.

The polyester carbonates according to the invention may be used industrially in the optical and electrical fields for example.

Example 1

22.8 g 2,2-bis-(4-hydroxyphenyl)-propane, 0.52 g versatic® acid 10 (3 mole %), 11 g 45% NaOH and 270 ml dichloromethane were introduced into a 1 liter four-necked flask. 16 g phosgene were introduced at room temperature (20° C.), 0.11 ml ethylpiperidine were added, and the mixture was subsequently stirred for 45 minutes. The mixture was acidified with dilute HCl and washed until free from ions. After drying and concentrating, 25.1 g of a product was obtained which had a relative solution viscosity of 1.28 (0.5% in methylene chloride). The glass transition temperature (measured by DSC) was 153° C. A bar 3.2 mm thick exhibited ductile fracture even at −20° C. when subjected to a notched bar impact test; a bar 4 mm thick exhibited a continuous ductile fracture at room temperature.

Comparative Example 1

A polycarbonate of the same solution viscosity but which was terminated with phenol had a glass transition temperature (measured by DSC) of 149° C. A 3.2 mm thick bar of the phenol-terminated polycarbonate exhibited brittle fracture even at 0° to −10° C. in the notched bar impact test; a bar 4 mm thick exhibited isolated brittle fractures even at room temperature.

Comparative Example 2

The procedure was as in Example 1, except that 3 mole % n-decanoic acid was used as the chain terminator instead of 3 mole % versatic® acid 10. 25.1 g polycarbonate was obtained which had a relative solution viscosity of 1.30. The glass transition temperature (measured by DSC) was 145° C. The incorporation was not as good as in Example 1, since the solution viscosity was greater than 1.28.

Comparative Example 3

The procedure was as described in Example 1, except that 4 mole % stearyl chloride was used as the chain terminator instead of 3 mole % versatic® acid 10. 25.2 g polycarbonate was obtained which had a relative solution viscosity of 1.31. Since a larger molar amount of chain terminator was used, a viscosity less than 1.28 would have been expected. This comparative test showed that stearic acid, even in the form of its reactive chloride and despite it more pronounced lipophilic properties, does not act as such an efficient chain terminator as versatic® acid 10.

We claim:

1. A process of preparing polycarbonates from diphenyls, chain terminators, phosgene and optionally branching agents, by the two-phase boundary process, characterized in that tertiary aliphatic monocarboxylic acids are used as the chain terminators in amounts from 0.6 mole % to 10 mole %, based on the moles of diphenyls, wherein the tertiary aliphatic monocarboxylic acids have the formula:

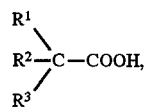

(I)

wherein $R^1$, $R^2$ and $R^3$ independently represent $C_1$–$C_{12}$ alkyl radicals.

2. The process of claim 1, wherein the alkyl radicals are $C_1$–$C_9$ alkyl radicals.

3. The process of claim 1, wherein the total number of carbon atoms in the tertiary aliphatic monocarboxylic acid is 9–16.

4. The process of claim 3, wherein the total number of carbon atoms in the tertiary aliphatic monocarboxylic acid is 9–13.

5. Thermoplastic aromatic polycarbonate produced by the process of claim 1.

6. Thermoplastic aromatic polycarbonate produced by the process of claim 2.

7. Thermoplastic aromatic polycarbonate produced by the process of claim 3.

8. Thermoplastic aromatic polycarbonate produced by the process of claim 4.

9. A process of preparing thermoplastic polyester carbonates from diphenols, chain terminators, phosgene, reactive aromatic dicarboxylic acid dichlorides and optionally branching agents, by the two-phase boundary process, characterized in that tertiary aliphatic monocarboxylic acids are used as the chain terminators in amounts from 0.6 mole %, based on the moles of diphenols used, wherein the tertiary aliphatic monocarboxylic acids have the formula:

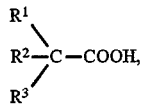
(I)

wherein $R^1$, $R^2$ and $R^3$ independently represent $C_1$–$C_{12}$ alkyl radicals.

10. The process of claim 9, wherein the alkyl radicals are $C_1$–$C_9$ alkyl radicals.

11. The process of claim 9, wherein the total number of carbon atoms in the tertiary aliphatic monocarboxylic acid is 9–16.

12. The process of claim 9, wherein the total number of carbon atoms in the tertiary aliphatic monocarboxylic acid is 9–13.

13. Thermoplastic aromatic polyester carbonate produced by the process of claim 9.

14. Thermoplastic aromatic polyester carbonate produced by the process of claim 10.

15. Thermoplastic aromatic polyester carbonate produced by the process of claim 11.

16. Thermoplastic aromatic polyester carbonate produced by the process of claim 12.

* * * * *